US007306263B2

(12) United States Patent
Hudson

(10) Patent No.: US 7,306,263 B2
(45) Date of Patent: Dec. 11, 2007

(54) EXPANDED CONTENT LABEL AND RELATED METHOD OF MANUFACTURE

(75) Inventor: Marshall J. Hudson, Port Huron, MI (US)

(73) Assignee: CCL Label, Inc., Memphis, TN (US)

( * ) Notice: Subject to any disclaimer, the term of this patent is extended or adjusted under 35 U.S.C. 154(b) by 164 days.

(21) Appl. No.: 11/173,258

(22) Filed: Jul. 1, 2005

(65) Prior Publication Data

US 2007/0029790 A1 Feb. 8, 2007

(51) Int. Cl.
*B42D 15/00* (2006.01)
*B32B 1/04* (2006.01)
*B65D 69/00* (2006.01)
*B65D 71/00* (2006.01)

(52) U.S. Cl. ...................... 283/107; 283/106; 283/108; 206/232; 428/68

(58) Field of Classification Search ................. 283/56, 283/74, 117, 81, 98–101, 105–109; 206/232; 40/124.09, 630, 631, 638; 428/40.1, 42.1–42.2, 428/43, 68; 493/52, 375–377, 961; 156/DIG. 2
See application file for complete search history.

(56) References Cited

U.S. PATENT DOCUMENTS 4,744,161 A * 5/1988 Instance
4,744,591 A * 5/1988 Instance ........................ 281/5
4,991,878 A * 2/1991 Cowan et al.
5,200,243 A * 4/1993 Van Leen
5,290,616 A * 3/1994 Cowan et al.
5,489,123 A * 2/1996 Roshkoff ..................... 283/81
5,588,239 A * 12/1996 Anderson
5,605,730 A * 2/1997 Treleaven .................. 428/40.1
5,746,689 A * 5/1998 Murphy ...................... 493/397
5,766,716 A * 6/1998 Barry
5,804,271 A * 9/1998 Barry
5,866,219 A * 2/1999 McClure et al.
5,972,455 A * 10/1999 Barry
6,027,598 A * 2/2000 Anderson ................... 156/253
6,213,520 B1 * 4/2001 Treleaven et al.
6,422,605 B1 * 7/2002 Lind
6,682,798 B1 * 1/2004 Kiraly ....................... 428/40.1
2003/0175508 A1 * 9/2003 Franko, Sr. ................. 428/354
2004/0256274 A1 * 12/2004 Betsch ....................... 206/484

* cited by examiner

*Primary Examiner*—Monica Carter
*Assistant Examiner*—Pradeep C Battula
(74) *Attorney, Agent, or Firm*—Warner Norcross & Judd LLP

(57) ABSTRACT

An expanded content label including independently accessible information fields. In one embodiment, the label includes an overlaminate and an expanded content device having fan-folded panels and first and second information fields. Optionally, the information fields are in different languages. The overlaminate is secured over the panels so that margins extend beyond opposing edges. Each margin is releasably and resealably adhered to a base label and/or an article. The panels fan-fold open when one margin is released to provide a user with a view of the first information field, but not the second information field, and vice versa when the other margin is released. A related method includes: providing a fan-folded device; placing an overlaminate over the device to form margins, and securing the device to a label base, wherein the margins are independently releasable and resealable to fan-fold open the device and selectively access either information field.

21 Claims, 7 Drawing Sheets

EXPANDED CONTENT LABEL AND RELATED METHOD OF MANUFACTURE

BACKGROUND OF THE INVENTION

The present invention relates to labels, and more particularly to an expanded content labels (ECLs) and a method for making the same.

Generally, an ECL is a label that provides an increased amount of printed information for inclusion with a product or its packaging. ECLs are increasingly used to replace leaflets, booklets, manuals, tags and other materials otherwise packaged with products to provide information about those products.

A conventional ECL includes a booklet or leaflet that is secured directly to the product or to a base label which secured to the product. Information about the product is printed on or in the booklet. Sometimes, information is printed in different languages so that the product can be distributed in countries where different languages are used, or to provide product information to a multilingual consumer base.

To provide multi-lingual information, many ECLs include a multi-paged booklet. On the first few pages of the booklet, information is provided in a first language, for example, English. In the remaining pages of the booklet, identical information is provided in a second language, for example, Spanish.

Although a common ECL can provide increased information, it suffers several shortcomings. As one example, to access information recorded in one language, the user must thumb through multiple pages of the ECL booklet to the find the foreign text that they require. This can be time consuming, and sometimes frustrating. As another example, some consumers may be offended when the information in their language is on the last pages of the booklet, rather than on the first pages. This can alienate the consumer, and possibly prevent them from purchasing the associated products.

SUMMARY OF THE INVENTION

The aforementioned problems are overcome in the present invention wherein an expanded content label includes a fan-folded expanded content device having selectively accessible, information-bearing panels.

In one embodiment, an expanded content label includes an overlaminate and an expanded content device. The expanded content device includes multiple fan-folded panels. A first group of panels includes a first information field, and a second group includes a second information field. Optionally, the information fields are instructions or product information, each field being in a different language. The panels can be arranged so that the panels and associated information fields are independently and selectively accessible by a user.

In another embodiment, the expanded content device and/or overlaminate is secured to a label base. The overlaminate can extend beyond opposite sides of the expanded content device and can be resealably adhered to the label base. With the overlaminate secured to the base in such a manner, a user can peel the overlaminate from the label base on one side of the device to access desired panels of the device. Because the panels are fan folded, only the desired panels—and thus desired information field—are accessed. After access, the user can reseal the overlaminate to the base. The same procedure can be used to separately access another information field in the device.

A method for manufacturing the label is also provided. In one embodiment, the method includes: providing fan-folded expanded content devices, each device including at least two panels, each panel having an associated information field; placing an overlaminate over the expanded content devices so that the overlaminate overlaps opposite sides of each device to form respective opposing margins; and resealably securing the device to at least one of a release liner and a label base. When included, the label base optionally includes an adhesive on a side opposite the device to secure the label base, and associated device and overlaminate, to an article.

The present invention provides simple and inexpensive ECLs having multiple information fields that are easy to identify and independently accessible. Where the information fields are provided in different languages, products labeled with the ECL are readily accepted in multilingual cultures, as well as by multilingual consumer bases.

These and other objects, advantages and features of the invention will be readily understood and appreciated by reference to the detailed description of the invention and the drawings.

DETAILED DESCRIPTION OF THE INVENTION

I. Overview

Figure 1:
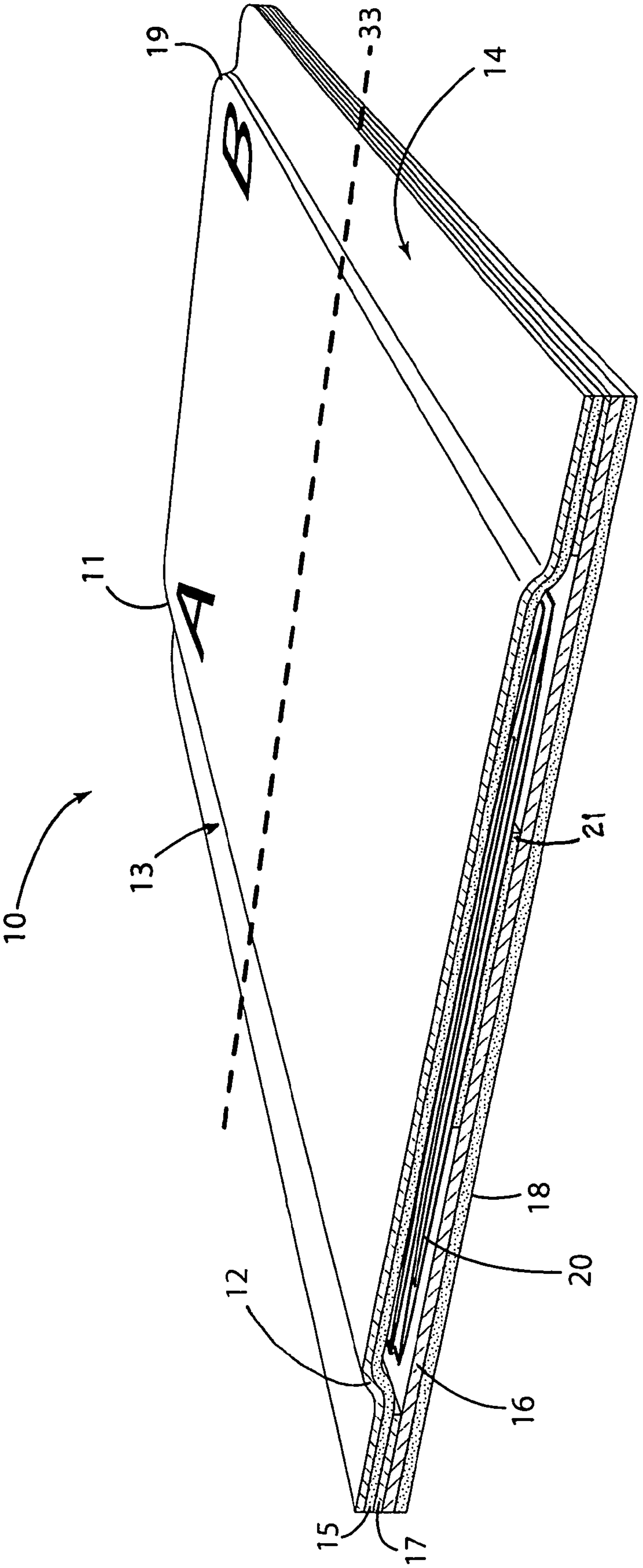
FIG. 1 is a perspective view of an expanded content label according to an embodiment described herein.
Figure 2:
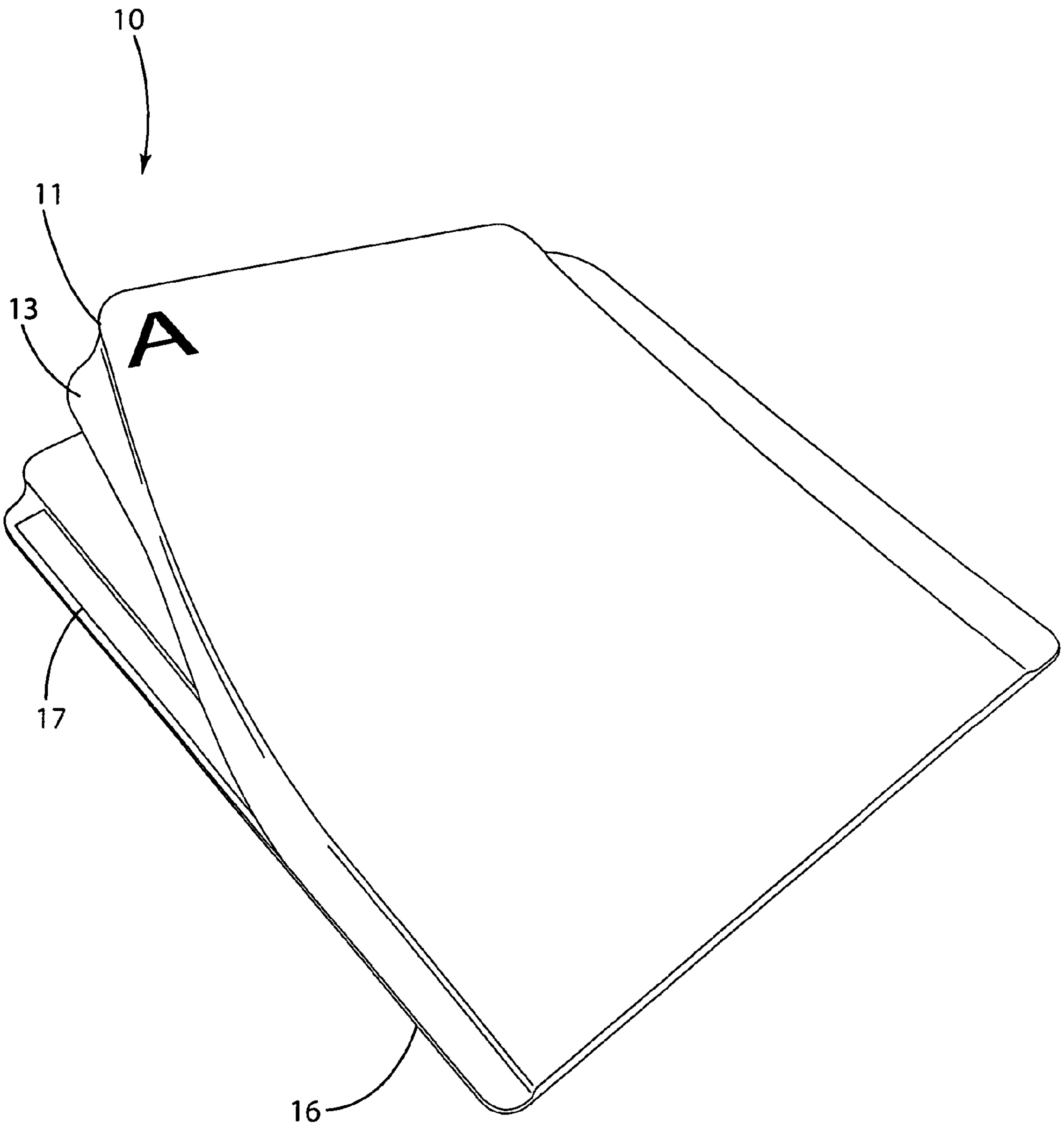
FIG. 2 is a perspective view of the expanded content label partially opened to access a first information field.
Figure 5:
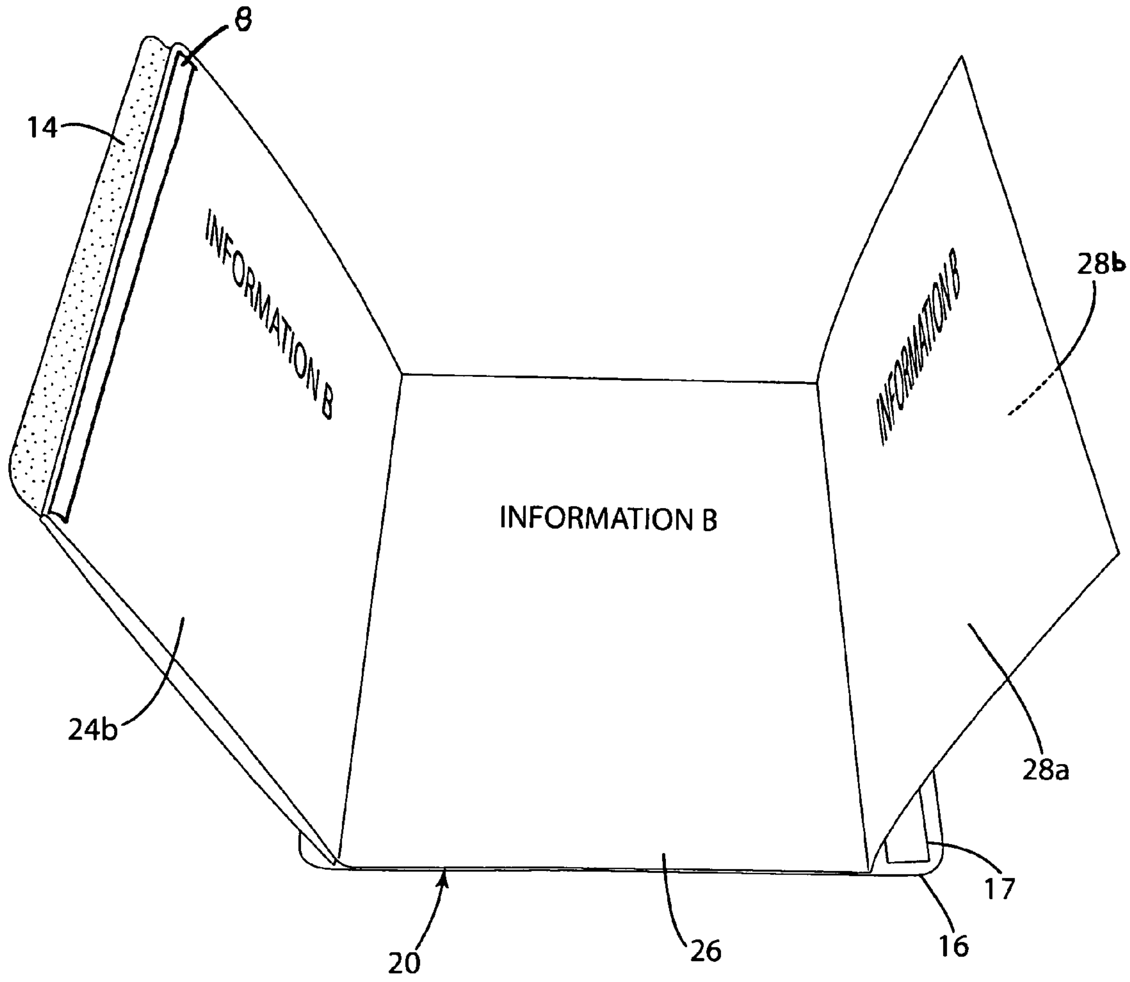
FIG. 5 is a perspective view of the expanded content label substantially opened to access the second information field.

An embodiment of the expanded content label (ECL) of the present invention is illustrated in FIGS. 1 and 2 and generally designated 10. The label 10 includes an overlaminate 12, an expanded content device 20, and an optional base label 16. The expanded content device 20 can include multiple fan-folded panels, printed with different information fields. Optionally, the information fields are in different languages. The overlaminate 12 can be secured over the device so that margins 13, 14 of the overlaminate extend beyond opposing edges of the device. Each margin can be releasably and resealably adhered to the base label 16, or, where the base label is not included, to an article. Optionally, the base label can include a release coating 17 which correspond to the margins to facilitate release from, and resealing of, the margins to the base label. The panels fan-fold open when one margin is released to provide a user with a view of the first information field (FIG. 3), but not the second information field, and vice versa when the other margin is released (FIG. 5).

Accordingly, with such a construction, a user can access a selected information field within the expanded content device independently—without having to access another, different information field. In one example, the ECL is useful where one information field includes product instructions written in English, and another information field includes identical instructions written in Spanish. With such an ECL, a Spanish-speaking user can easily access their information field without having to access or otherwise sort through the English information field.

II. Construction

With reference to FIGS. 1-6, construction of the expanded content label 10 and its components will be described in more detail. The base label 16 includes first and second sides. The second side, or underside, is coated with an adhesive layer 18, which can cover the entire underside or selected, patterned portions of the underside. The base label can include one or more release compositions and/or coatings in areas corresponding to the locations where the margins 13, 14 of the overlaminate are joined with the base label 16. Suitable release coatings include varnishes, wax coatings, silicone and non-silicone based coatings. An example of a suitable coating is offered under the identifier K0504183, which is commercially available from Sovereign Specialty Chemical of Kimberton, Pa. As noted above, the base label may be entirely absent from the ECL 10 without significantly altering its performance. The expanded content label, the base label and any other components can be manufactured from many materials, including paper, plastic, foil, metals, and the like.

Overlaminate 12 is secured over the expanded content device 20 and, as shown, can secure the device to the base label 16. More specifically, the overlaminate extends beyond the sides or edges of the expanded content device 20 at margins 13 and 14. The entire underside, or selected portions of the underside of the overlaminate, can be coated with an adhesive 15. Where the margins include adhesive 15, it secures them to the base layer 16. With such an attachment, the expanded content device is sandwiched between the base 16 and the overlaminate 12. The adhesive 15, at least in areas corresponding to the margins 13, 14, can be a pressure sensitive releasable adhesive. Suitable adhesives are those that are releasable and/or resealable. Examples of suitable adhesives are offered under the identifiers S692 or S1000 and are commercially available from Fasson Roll of North America and Avery Dennison of Paineville, Ohio. The overlaminate 12 can be transparent, opaque, and/or colored, depending on the application. Furthermore, the dimensions of the overlaminate relative to the expanded content device and base label can be altered as desired.

Optionally, one or more of the panels adjacent the margins 13, 14 having adhesive 15 can be coated with a release coating 8, for example a varnish. This coating can prevent the margins from inadvertently adhering to the panels when the ECL is opened.

The expanded content label 10, specifically, one or more of the base label 16, overlaminate 12, and/or expanded content device 20, can be cut or otherwise configured to form tabs 11, 19. These tabs can assist a user in grasping the respective margins 13, 14 to selectively open the device 20 and access specific information as explained in detail below. Additionally, the overlaminate and/or top panel of the device 20 can include instructions A and B to inform a user which tab or margin to grasp and release from the label base 16 to access a particular information field within the device 20.

Figure 6:
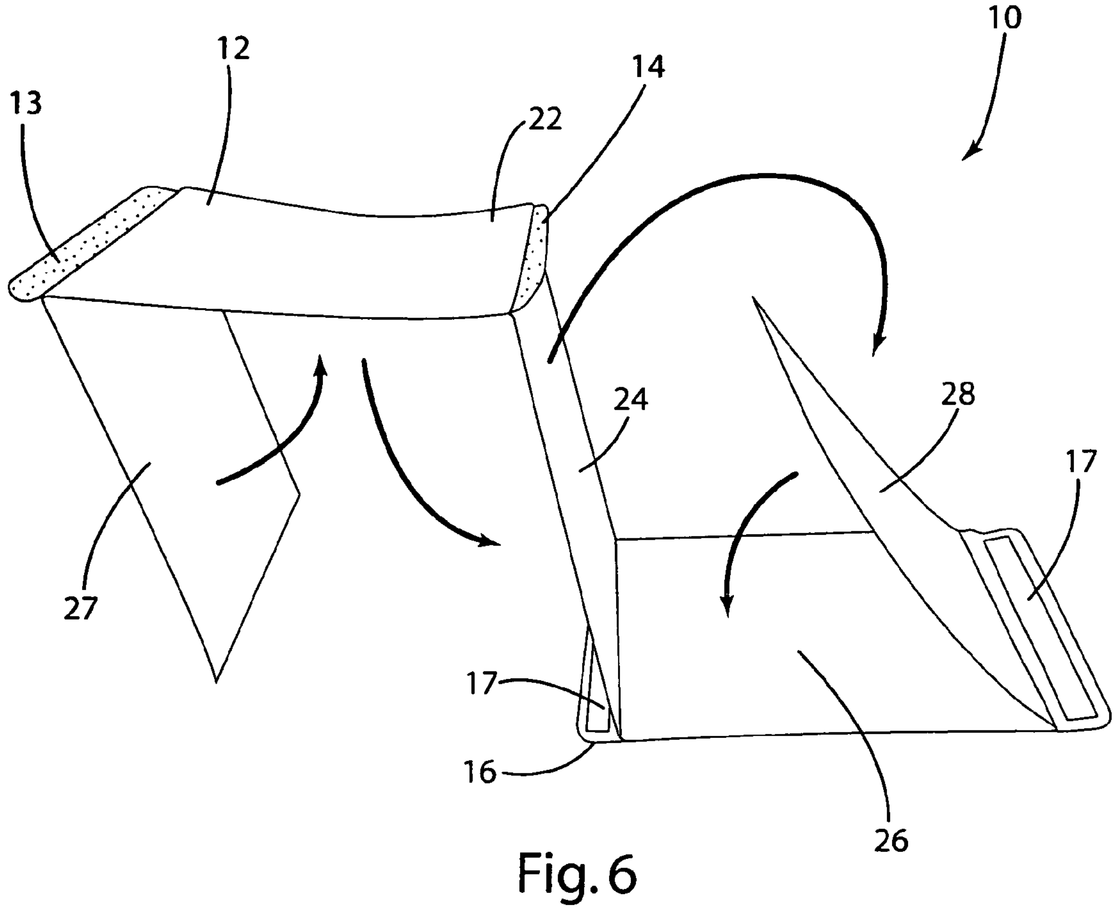
FIG. 6 is a perspective view of a fully opened expanded content label.

The expanded content device 20 as shown includes multiple panels fan-folded over one another. One particular type of fan-fold is the Z-fold, which, as the name implies, includes at least three panels folded over one another to form a Z shape when viewed from ends of the panels. FIG. 6 shows how an exemplary device 20 including multiple panels 22, 24, 26, 27 and 28 is fan-folded. The arrows in that figure illustrate the sequence of folding the panels over one another. Panels 22, 24 and 26 cooperate to form the primary "Z" fold of the device 20. Panels 27 and 28 provide additional surfaces on which to include information. Panel 26 optionally is secured to the base 16 with an adhesive 21.

The panels of the device generally have a length that is the same as the base label 16. The panels are printed with any indicia, including text or graphics of any kind, collectively referred to as information. Such information can be in the form of directions, product ingredients, installation instructions, product warnings, coupons, and/or any other informative or display material. Information can be printed on the panels using offset, screen or other suitable printing techniques. The specific relationship of the information to the panels of the device will be explained in more detail below in connection with a description of the label 10 method of use.

Optionally, the label 10 can be modified to provide multiple, additional information fields. For example, the label 10 can be cut along cut line 33 (FIG. 1), which penetrates the overlaminate, and the panels of the expanded content device. Accordingly, the now-separated top and bottom portions of the device can be accessed independent from one another. In such an embodiment, the top portion of the label 10 can include two separately accessible information fields within the device associated with that top portion, for example, instructions in English and Spanish. Likewise, the bottom portion of the label 10 can include two more separately accessible information fields within the device associated with that bottom portion, for example, instructions in Italian and German. Accordingly, one label can provide multiple, independently accessible information fields.

II. Method of Use

An understanding of the independently accessible information provided by the expanded content label 10 is best understood with reference to its use and construction in concert. FIGS. 2-5 show how different information fields are accessed independent and separately from one another using the expanded content device 10. In an exemplary embodiment, the information fields described below, Information A and Information B, can be product instructions or other information in English and in Spanish, respectively.

Figure 3:
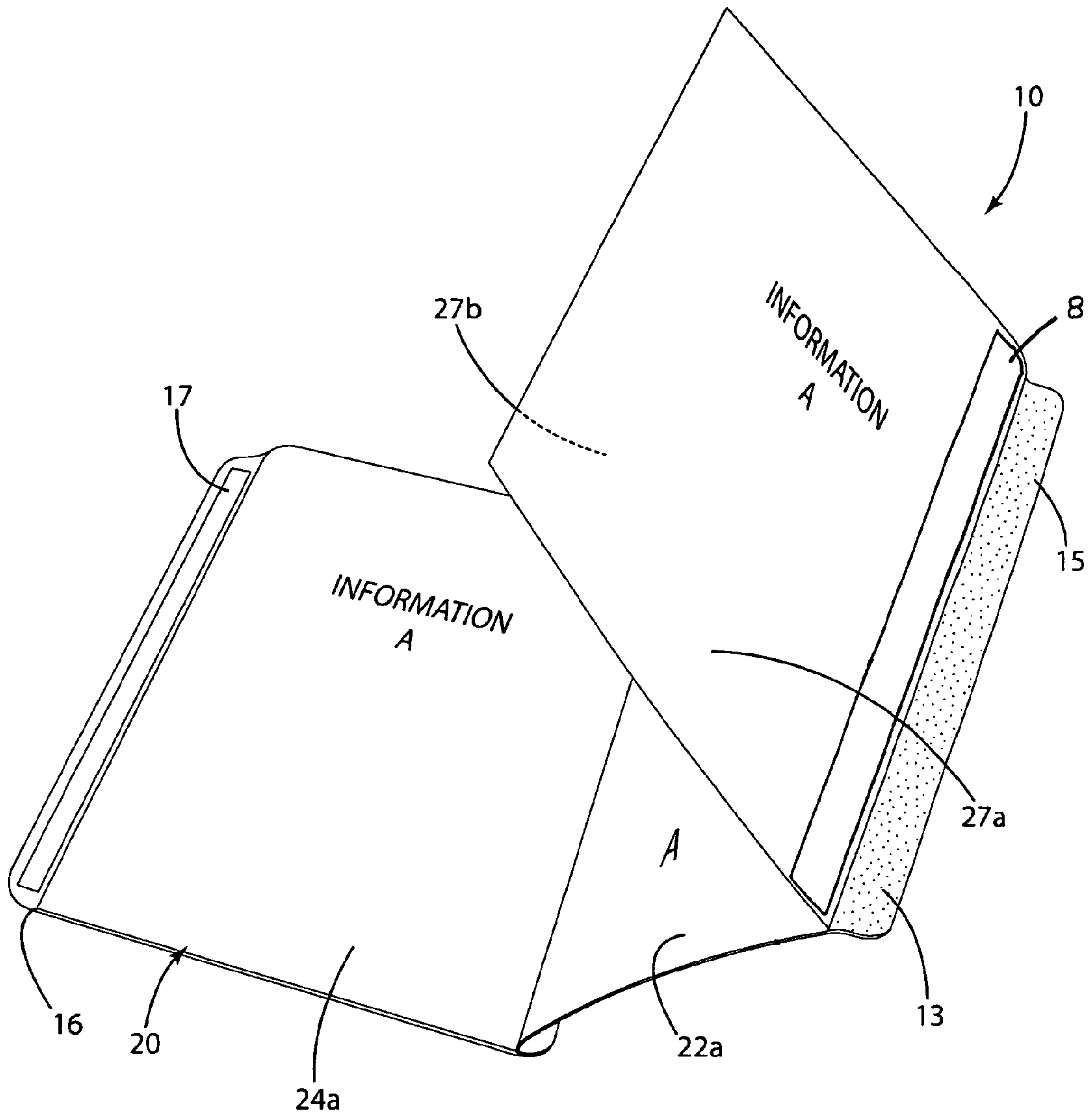
FIG. 3 is a perspective view of the expanded content label substantially opened to access the first information field.

With reference to FIG. 2-3, a user, who desires to access only Information A, which is a first information field, will grasp tab 11 which corresponds to instruction A on the front of the label 10. The user pulls the tab 11, which in turn releases the margin 13 from the portion of the base label 16 to which it is adhered, or, where the base label includes a release coating 17, from that release coating 17. After the margin 13 is completely released, the fan-folded panels 22 and 27 of the expanded content device 20 fan open to expose panel sides 24*a*, 22*a*, 27*a* and 27*b*, all of which are printed with Information A. The user can thus peruse the Information A. Due to the fan-folded orientation of the panels, when the expanded content label 10 is opened, only Information A is viewable by the user; Information B, which is on other sides of the panels (FIG. 5), as well as other panels altogether, is not viewable. To close the device 20, the user fan-folds the panels closed, and reseals the margin 13 to the corresponding release coating 17.

Figure 4:
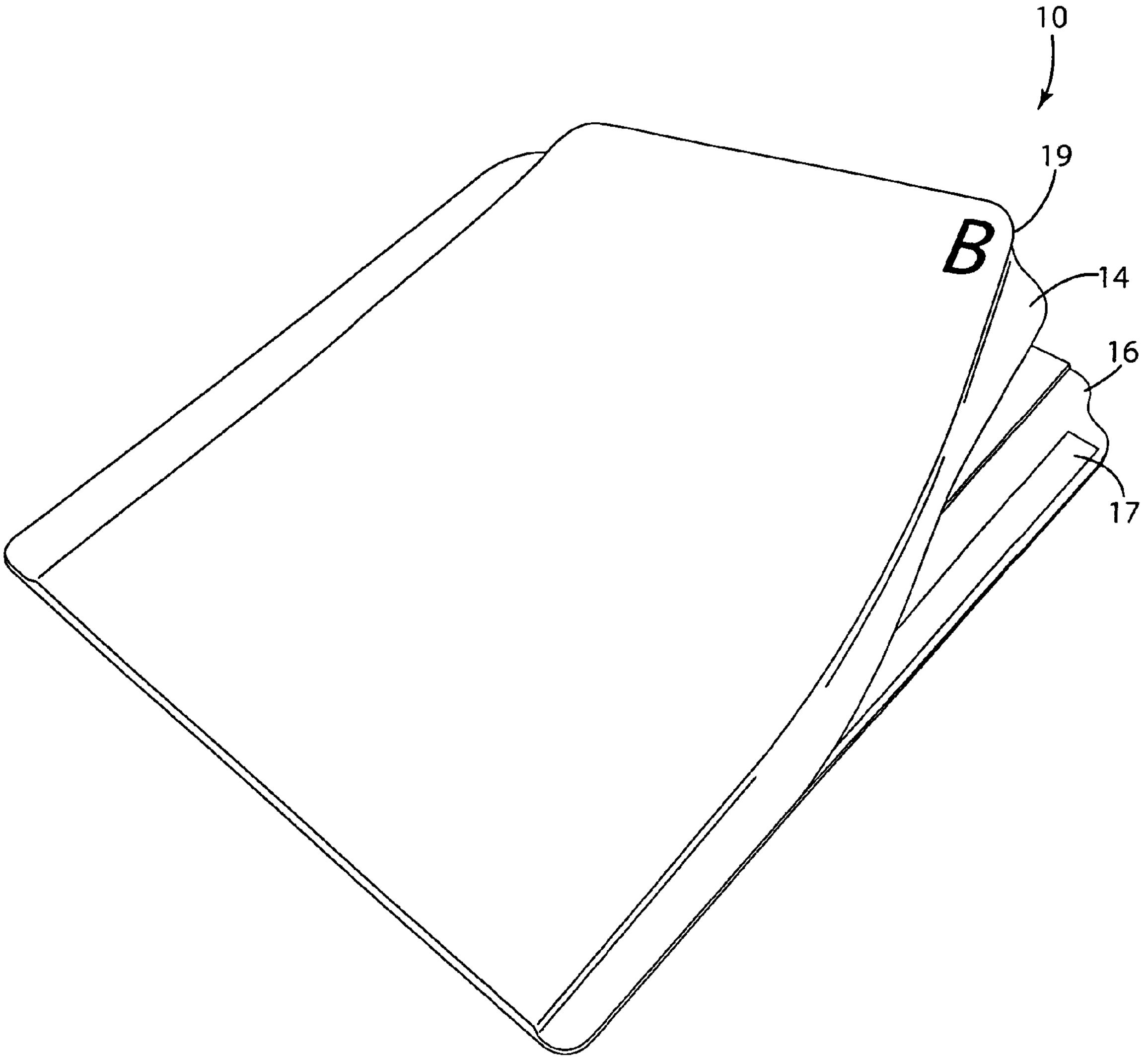
FIG. 4 is a perspective view of the expanded content label partially opened to access a second information field.

With reference to FIG. 4-5, a user, who desires to access only Information B, which is a second information field, will grasp tab 19 which corresponds to instruction B on the front of the label 10. The user pulls the tab 19, which in turn releases the margin 14 from the portion of the base label 16 to which it is adhered, or, where the base label includes a release coating 17, from that release coating 17. After the margin 14 is completely released, the fan-folded panels 24 and 28 of the expanded content device 20 fan open to expose panel sides 24*b*, 26, 28*a* and 28*b*, all of which are printed with Information B. The user can thus peruse the Information B. Due to the fan-folded orientation of the panels, when the expanded content label 10 is opened, only Information B is viewable by the user; Information A, which is on other sides of the panels (FIG. 3), as well as other panels altogether, is not viewable. To close the device 20, the user fan-folds the panels closed, and reseals the margin 14 to the corresponding release coating 17.

II. Method of Manufacture

A method of manufacture of the ECL 10 will now be described in connection with FIG. 7. Although it is possible to produce labels one at a time, the method described below produces multiple labels in continuous web form.

The method begins with the provision of a continuous web of pressure-sensitive base label stock 18 adhered to a silicone-based release liner 60. The web can be purchased as a prefabricated assembly, however, it also can be custom manufactured to allow patterning of the adhesive as desired. The base label stock can include a pattern of release coating material 17. A plurality of pre-fan-folded expanded content devices 20 are placed on the label stock 16. Optionally, the devices can be adhered to the stock with an adhesive 21 on the bottom most panel of the device. These devices 14 each include the information fields A and B as described above.

Figure 7:
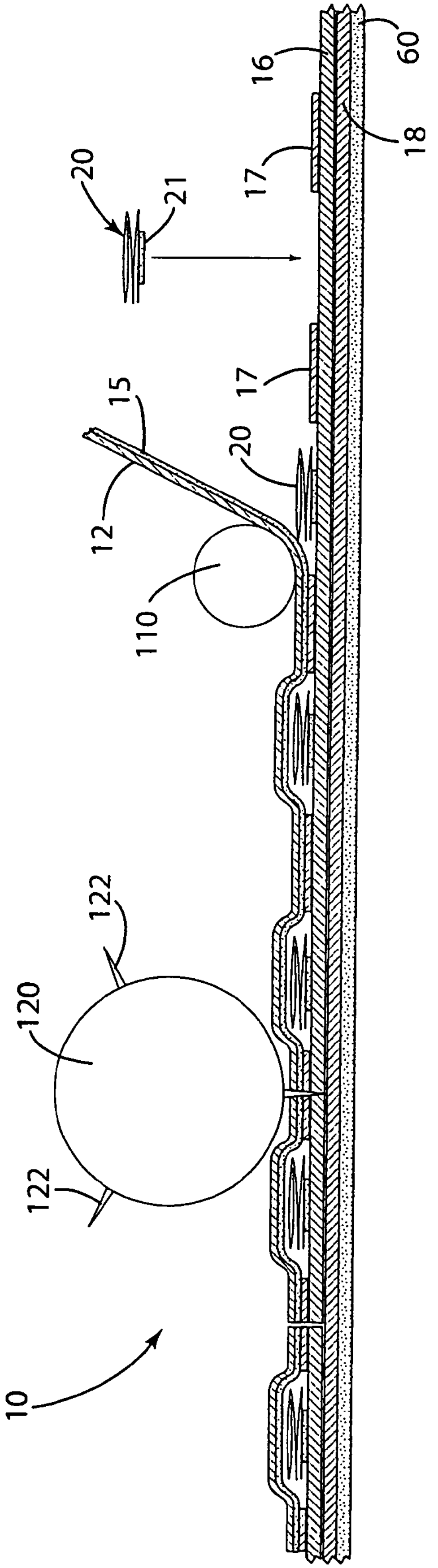
FIG. 7 is a perspective view of a process for manufacturing expanded content labels.

As shown in FIG. 7, a roller presses an overlaminate 12 backed with adhesive 15 over the expanded content devices 20, the release material 17 and the label stock 16, thereby securing the overlaminate to those components. In embodiments where the release coating material 17 is absent, the overlaminate 12 is adhered to the stock 16. Moreover, in embodiments where the label stock is absent, the overlaminate 12 is applied directly over the devices and adhered to the release liner 60, thereby securing those devices 20 to the release liner 60.

The web is advanced to a cutting die 120 which includes die cutting and/or knife cutting machinery, for example blades 122. There, the web is cut through the overlaminate 12, and optionally the release coating 17 if present, and optionally the label stock 16 if present. With this cut, individual expanded content labels 10 are formed, but remain on the release liner to facilitate later application to articles. The resulting web, now comprised of multiple individual ECLs 10, can be wound into a spool for further distribution. Individual ECLs 10 then can be applied from this web to articles in a conventional manner.

Articles labeled with an ECL 10 subsequently include multiple information fields, which can be selectively accessed and used by users.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The invention claimed is:

1. An expanded content label comprising:

a base including a first side and a second side, the first side including an adhesive;

an expanded content device including a plurality of joined, fan-folded panels, the plurality of panels including a first subset of panels having at least one first panel having a first information field, a first panel side and a first panel opposite side located on the opposite side of the first panel from the first panel side and a second subset of panels having at least one second panel having a second panel side and a second panel opposite side located on the opposite side of the second panel from the second panel side a second information field, the expanded content device secured to the second side of the base; and an overlaminate secured over the expanded content device, the overlaminate including a first margin extending beyond the expanded content device on one side of the device, and a second margin extending beyond the expanded content device on an opposite side of the device, each of the first margin and second margin resealably adhered to the second side of the base, wherein the first subset of panels and the second subset of panels are each independently and separately accessible by selectively releasing either the first margin or the second margin, wherein all panels in the first subset of panels, including the first panel, the first panel side, the first panel opposite side and the first information field, are accessed only when the first margin is released, but not when the second margin is released, wherein all the panels in the second subset of panels, including the second panel, the second panel side, the second panel opposite side, and the second information field are accessed only when the second margin is released, but not when the first margin is released.

2. The expanded content label of claim 1 wherein the first information field is provided in a first language and wherein the second information field is provided in a second language.

3. The expanded content label of claim 2 wherein the first language is English and the second language is Spanish.

4. The expanded content label of claim 1 wherein the overlaminate is transparent.

5. An expanded content label comprising:

a base including a first side and a second side, the first side including an adhesive;

an expanded content device including a plurality of joined, fan-folded panels, the plurality of panels including a first subset of panels having at least one first panel having a first information field and a second subset of panels having at least one second panel having a second information field, the expanded content device secured to the second side of the base;

an overlaminate secured over the expanded content device, the overlaminate including a first margin extending beyond the expanded content device on one side of the device, and a second margin extending beyond the expanded content device on an opposite side of the device, each of the first margin and second margin resealably adhered to the second side of the base, wherein the first subset of panels and the second subset of panels are each independently and separately accessible by selectively releasing either the first margin or the second margin respectively, from the second side to selectively fan-fold open the respective first subset of panels or the second subset of panels; and a first tab associated with the first margin to enable a user to grasp the first margin and open the device to access the first information field, but wherein the second margin remains releasably attached to the second side so no access is gained to the second subset of panels.

6. An expanded content label comprising:

a base including a first side and a second side, the first side including an adhesive;

an expanded content device including a plurality of joined, fan-folded panels, the plurality of panels including a first subset of panels having at least one first panel having a first information field and a second subset of panels having at least one second panel having a second information field, the expanded content device secured to the second side of the base;

an overlaminate secured over the expanded content device, the overlaminate including a first margin extending beyond the expanded content device on one side of the device, and a second margin extending beyond the expanded content device on an opposite side of the device, each of the first margin and second margin resealably adhered to the second side of the base, wherein the first subset of panels and the second subset of panels are each independently and separately accessible by selectively releasing either the first margin or the second margin respectively, from the second side to selectively fan-fold open the respective first subset of panels or the second subset of panels; and a second tab associated with the second margin to enable a user to grasp the second margin and open the device to access the second information field, but wherein the first margin remains releasably attached to the second side so no access is gained to the first subset of panels.

7. The expanded content label of claim 6 wherein the base, expanded content device and overlaminate are cut along a cut line to provide two independent expanded content labels.

8. A construction comprising:

an expanded content device including opposing edges and a plurality of fan-folded panels including a first subset of panels having a first information field and a second subset of panels having a separate second information field; and an overlaminate including opposing margins, the overlaminate secured over the expanded content device so that the margins extend beyond the opposing edges;

wherein each margin is releasably and resealably adhered to at least one of a base label and an article;

wherein the panels fan-fold open when one margin is released from at least one of the base label and the article to provide a user with access to all panels in the first subset of panels having the first information field, but none of the panels in the second subset of panels having the second information field; and wherein the panels fan-fold open when another margin is released from at least one of the base label and the article to provide a user with access to all panels in the second subset of panels having the second information field, but none of the panels in the first subset of panels having the first information field.

9. The construction of claim 8 wherein the plurality of fan-folded panels includes a first panel, a second panel connected to the first panel along a fold line and a third panel connected to the second panel along another fold line, the first panel, the second panel and the third panel fan-folded over one another to resemble a "Z" when viewed from an end of the expanded content device.

10. The construction of claim 9 wherein the overlaminate is joined with the first panel, and the third panel is adhered directly to at least one of the article and the label base.

11. The construction of claim 9 wherein the first panel includes a first side and a second side, wherein the second panel includes a third side and a fourth side, and wherein the third panel includes a fifth side and a sixth side.

12. The construction of claim 11 wherein the first information field is included on the second side and third side, and wherein the second information field is included on the fourth side and sixth side.

13. The construction of claim 12 wherein the first information field is in English and the second information field is in Spanish.

14. The construction of claim 8 wherein the first subset of panels including at least one first panel having an upper side and an underside opposite the upper side, wherein both the upper side and underside are accessed when the one margin is released from at least one of the base label and the article.

15. A method comprising:

providing an expanded content device including opposing edges and a plurality of fan-folded panels, the plurality of panels including a first panel having a first information field and a second panel having a separate second information field;

placing an overlaminate including an adhesive over the expanded content device so that the overlaminate includes a first portion that extends beyond one of the opposing edges and a second portion that extends beyond the other of the opposing edges; and securing the expanded content device to a label base with the overlaminate, wherein the first portion is releasable from the label base so that the fan-folded panels open to provide access to the first panel and first information field but not the second panel and second information field, the first portion also being resealable to the label base to re-close the device, and wherein the second portion is releasable from the label base so that the fan-folded panels open to provide access to the second panel and second information field but not the first panel and first information field, the second portion also being resealable to the label base to re-close the device.

16. The method of claim 15 comprising releasing the first portion from the label base to expose the first panel and first information field, wherein the access to the second panel and second information field remains restricted so that the second panel and second information field are unexposed and hidden until the second portion is released from the label base.

17. The method of claim 15 comprising cutting at least one of the overlaminate and the expanded content device to form a first grasping tab uniquely associated with the first portion so that a user can grasp and release only the first portion from the base label.

18. The method of claim 17 comprising cutting at least one of the overlaminate and the expanded content device to form a second grasping tab uniquely associated with the second portion so that a user can grasp and release only the second portion from the base label.

19. The method of claim 15 wherein the plurality of fan-folded panels include a cover panel joined with theoverlaminate and an intermediate panel, the intermediate panel being adhered directly to the label base.

20. The method of claim 15 comprising repeating said providing, placing and securing steps to serially produce a continuous web of expanded content labels wherein the first panel includes an upper side and an underside opposite the upper side, wherein both the upper side and underside are accessed when the first portion is released from the label base.

21. A construction comprising:

an expanded content device including a plurality of fan-folded panels including a first subset of panels including a first information field and a second subset of panels including a different, second information field, the plurality of panels include a cover panel, an intermediate panel joined with the cover panel and a base panel joined with the intermediate panel, the base panel including an upper surface and a lower surface, the lower surface being adhered directly to at least one of a base label and an article so that the lower surface is unviewable by a user of the expanded content device; and an overlaminate permanently adhered to the cover panel, the overlaminate extending beyond the expanded content device at opposing first and second overlaminate margins, wherein the first margin is resealably adhered to and releasable from the at least one of the base label and the article to expose to a viewer the first subset of panels including the first information field, but none of the second subset of panels nor the second information field, wherein the second margin is resealably adhered to and releasable from the at least one of the base label and the article to expose to a viewer the second subset of panels including the second information field, but none of the first subset of panels nor the first information field.

* * * * *